United States Patent [19]
Keeney et al.

[11] 3,867,462
[45] Feb. 18, 1975

[54] COLOR INHIBITORS IN GLYCOL ETHERS

[75] Inventors: Franklin N. Keeney, Midland; Edmund H. Sommerfield, Bay City, both of Mich.

[73] Assignee: The Dow Chemical Company, Midland, Mich.

[22] Filed: Aug. 24, 1972

[21] Appl. No.: 283,383

[52] U.S. Cl............ 260/611.5, 252/400 R, 252/75
[51] Int. Cl............................................ C07c 43/00
[58] Field of Search......... 260/611.5; 252/400 R, 75

[56] References Cited
UNITED STATES PATENTS

| | | | |
|---|---|---|---|
| 2,885,446 | 5/1959 | Sharp et al. | 260/643 |
| 2,979,524 | 4/1961 | Wright et al. | 260/462 |
| 2,982,733 | 5/1961 | Wright et al. | 252/75 |
| 3,262,961 | 7/1966 | Jordan | 260/462 |
| 3,338,835 | 8/1967 | Wright | 252/75 |
| 3,342,736 | 9/1967 | Nankee | 252/75 |

FOREIGN PATENTS OR APPLICATIONS
425,728   3/1935   Great Britain................. 260/611.5

OTHER PUBLICATIONS
Burchinskaya, Ukr. Khim. Zh. 30(2), 177, (1964).

*Primary Examiner*—Howard T. Mars
*Assistant Examiner*—Nicky Chan
*Attorney, Agent, or Firm*—Chessie E. Rehbery

[57] ABSTRACT

Alkali and alkaline earth metal borates, even at concentrations of only 10 p.p.m., are effective color inhibitors for glycol ethers, even in the presence of iron.

3 Claims, No Drawings

COLOR INHIBITORS IN GLYCOL ETHERS

BACKGROUND OF THE INVENTION

Alkali and alkaline earth metal borates and their condensates with alkylene glycols or glycol ethers are well known as corrosion inhibitors for automotive brake fluids consisting predominantly of alkyl monoethers of alkylene glycols and lower polyalkylene glycols. See, for example, U.S. Pat. Nos. 2,979,524, 2,982,733, 3,087,959, 3,342,736 and 3,625,899. In such usage, the proportion of borate varies from about 0.1 to 80 percent or more.

In attempts to improve the storage stability of glycol ethers, a wide variety of additives have been proposed, most of them being known antioxidants of the phenolic or aromatic amine type (see Lloyd, U.S. Pat. No. 3,146,272). However, the discoloration problem is not necessarily associated with oxidation, since material in full, sealed containers often discolors during storage.

SUMMARY OF THE INVENTION

It has now been discovered that the discoloration of glycol ethers can be substantially inhibited by the presence of alkali or alkaline earth metal borate.

By "glycol ethers" we mean the monoethers of the lower alkylene glycols, diglycols and lower polyglycols. In general they correspond to the formula $$R(OC_nH_{2n})_xOH$$

wherein R is phenyl or lower alkyl (i.e., having up to about 6 carbon atoms), $n$ is an integer 2 to 4 and $x$ is an integer 1 to about 5. The ethers of most interest are those in which R is an alkyl group of 1 to 4 carbon atoms, $n$ is 2 and $x$ is 1 or 2.

The alkali or alkaline earth metal borate may be any of the known class, though the preferred ones are the sodium and potassium salts of the common boric acids; i.e., the orthoborates, metaborates, tetraborates and pentaborates. Of these, the alkali metal metaborates and tetraborates are preferred.

The amount of borate needed to inhibit color formation in a glycol ether varies widely, depending on the particular ether, the storage conditions and the length of time during which inhibition is needed. Higher temperatures and longer storage times increase the need for better inhibition. Another important factor is the nature and amount of impurities in the ether. Ferric ions greatly increase the rate of color formation; hence, the presence of even trace amounts of iron increases the need for color inhibition. In the normal situation, where the usual trace amounts of iron are present, and color inhibition is needed for room temperature storage for a few weeks to, at most, a few months, about 10–100 p.p.m. of borate in the glycol ether gives adequate protection.

The alkali and alkaline earth metal borates as usually found in the marketplace are hydrated salts containing up to 10 or more molecules of water of hydration. For this reason, and because the hydrated salts are more readily dissolved in the glycol ethers, it is usually preferred to use the hydrates. Where it is important to exclude all traces of moisture, the anhydrous borates can be used or the inhibited material can be devolatilized to remove water after addition of the hydrated salt. Alternatively, the water of hydration can be replaced with glycol or glycol ether by heating the hydrated salt with the glycol or ether to drive off the water of hydration.

SPECIFIC EMBODIMENTS OF THE INVENTION

An accelerated aging test was used to estimate the color stability of the glycol ethers. In this test, two of the most potent factors involved in normal storage of the materials, i.e., exposure to heat and iron, were accentuated. The tests were made as follows:

A 50 ml. glass flask was charged with 50 g. of the glycol ether, 2.5 g. of iron filings and the indicated amount of borate inhibitor. The flasks were stoppered without any attempt to exclude or remove air and then placed in an oven at 100°C. for the indicated time. At the end of the test period the APHA color of the samples was measured. Results are shown in the following table.

| | COLOR INHIBITION IN GLYCOL ETHERS R(OCH$_2$CH$_2$)$_x$OH | | | | | |
|---|---|---|---|---|---|---|
| | Glycol Ether | | Inhibitor | | Time, | Color, |
| Ex. No. | R | x | Formula | Amt., p.p.m. | Hr. | APHA |
| 1 | CH$_3$ | 1 | None | | 72 | >100 |
| 2 | do. | 1 | NaBO$_2$·PG* | 25 | 72 | 5 |
| 3 | do. | 1 | NaBO$_2$·4H$_2$O | 10 | 72 | 5 |
| 4 | do. | 1 | NaBO$_2$·PG | 10 | 96 | 10 |
| 5 | do. | 1 | NaBO$_2$·4H$_2$O | 10 | 96 | 10 |
| 6 | do. | 1 | Na$_2$B$_4$O$_7$·10H$_2$O | 50 | 96 | 10 |
| 7 | do. | 1 | K$_2$B$_4$O$_7$·5H$_2$O | 50 | 96 | 5 |
| 8 | do. | 1 | NaB$_5$O$_8$·PM* | 50 | 96 | >100 |
| 9 | do. | 1 | NaB$_5$O$_8$·TMH* | 50 | 96 | >100 |
| 10 | C$_2$H$_5$ | 1 | None | | 48 | >100 |
| 11 | do. | 1 | NaBO$_2$·PG | 50 | 48 | 10 |
| 12 | do. | 1 | NaBO$_2$·4H$_2$O | 50 | 48 | 5 |
| 13 | do. | 1 | KB$_5$O$_8$·4H$_2$O | 50 | 48 | 25 |
| 14 | do. | 1 | K$_2$B$_4$O$_7$·5H$_2$O | 50 | 48 | 5 |
| 15 | do. | 1 | Na$_2$B$_4$O$_7$·10H$_2$O | 50 | 48 | 10 |
| 16 | do. | 1 | None | | 24 | >100 |
| 17 | do. | 1 | NaBO$_2$·4H$_2$O | 50 | 24 | 5 |
| 18 | n-Butyl | 1 | None | | 72 | >100 |
| 19 | do. | 1 | NaBO$_2$·4H$_2$O | 50 | 72 | 5 |
| 20 | C$_2$H$_5$ | 2 | None | | 168 | >100 |
| 21 | C$_2$H$_5$ | 2 | NaBO$_2$·4H$_2$O | 50 | 168 | 5 |
| 22 | n-Butyl | 2 | None | | 168 | >100 |
| 23 | do. | 2 | NaBO$_2$·4H$_2$O | 50 | 168 | 10 |
| 24 | CH$_3$ | 2 | None | | 72 | >100 |
| 25 | do. | 2 | NaBO$_2$·4H$_2$O | 50 | 72 | 25 |
| 26 | CH$_3$ | 1 | None | | 24 | 30 |
| 27 | do. | 1 | NaBO$_2$·4H$_2$O | 50 | 24 | 15 |
| 28 | do. | 1 | KBO$_2$ | 50 | 24 | 15 |
| 29 | do. | 1 | Mg(BO$_2$)$_2$·8H$_2$O | 50 | 24 | 20 |
| 30 | do. | 1 | LiBO$_2$·8H$_2$O | 50 | 24 | 15 |
| 31 | do. | 1 | CaB$_4$O$_7$ | 50 | 24 | 20 |
| 32 | C$_6$H$_5$ | 1 | None | | 336 | 50 |
| 33 | do. | 1 | NaBO$_2$·4H$_2$O | 10 | 336 | 30 |

* PG is propylene glycol, PM is propylene glycol monomethyl ether, TMH is the monomethyl ether of triethylene and higher glycols.

We claim:
1. A glycol ether containing a color-inhibiting amount not exceeding about 100 ppm of an alkali or alkaline earth metal borate wherein the ether has the formula,

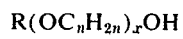

wherein R is phenyl or alkyl of up to about 6 carbon atoms, $n$ is an integer 2 to 4 and $x$ is an integer 1 to about 5.

2. The ether of claim 1 wherein the borate is sodium or potassium metaborate or tetraborate.

3. The ether of claim 1 wherein R is alkyl of up to 4 carbon atoms, $n$ is 2 and $x$ is 1 or 2.

* * * * *